United States Patent
Heidinga et al.

(10) Patent No.: US 11,120,147 B2
(45) Date of Patent: Sep. 14, 2021

(54) OPERATING SYSTEM GARBAGE-COLLECTION WITH INTEGRATED CLEARING OF SENSITIVE DATA

(71) Applicant: International Business Machines Corporation, Armonk, NY (US)

(72) Inventors: Daniel Heidinga, Ottawa (CA); Charles R. Gracie, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 16/127,503

(22) Filed: Sep. 11, 2018

(65) Prior Publication Data

US 2020/0082103 A1 Mar. 12, 2020

(51) Int. Cl.
  *G06F 21/60* (2013.01)
  *G06F 12/02* (2006.01)
  *G06F 16/22* (2019.01)

(52) U.S. Cl.
  CPC ........ *G06F 21/604* (2013.01); *G06F 12/0253* (2013.01); *G06F 16/2246* (2019.01); *G06F 2212/1044* (2013.01)

(58) Field of Classification Search
  CPC ............... G06F 21/604; G06F 16/2246; G06F 12/0253; G06F 2212/1044
  See application file for complete search history.

(56) References Cited

U.S. PATENT DOCUMENTS

| | | | |
|---|---|---|---|
| 7,756,911 B2 * | 7/2010 | Bacon | G06F 12/0269 707/813 |
| 8,065,349 B2 | 11/2011 | Wright et al. | |
| 8,205,203 B2 | 6/2012 | Auerbach et al. | |
| 8,725,982 B2 | 5/2014 | Tene et al. | |

(Continued)

OTHER PUBLICATIONS

C. Pan, M. Xie, C. Yang, Z. Shao and J. Hu, "Nonvolatile main memory aware garbage collection in high-level language virtual machine," 2015 International Conference on Embedded Software (EMSOFT), Amsterdam, 2015, pp. 197-206, doi: 10.1109/EMSOFT.2015.7318275. (Year: 2015).*

(Continued)

*Primary Examiner* — Robert B Leung
*Assistant Examiner* — Sameera Wickramasuriya
(74) *Attorney, Agent, or Firm* — Schmeiser, Olsen & Watts; Michael P. O'Keefe (57) ABSTRACT

A computerized operating system begins a garbage-collection operation by collecting a set of "garbage" data objects to be deleted. Certain of these objects are identified, either by an embedded identifier or by an entry in a sensitive-objects data structure, as containing sensitive data. When the garbage collector moves or deletes a sensitive object during the garbage-collection procedure, the collector zeroes out any residual data left at the object's original location in memory or secondary storage. If the collector determines that the object no longer has any connection to other software entities, the collector zeroes out the storage locations of all identified instances of the object. The collector then updates the data structure to indicate the current location of sensitive objects that have been moved or copied, and deletes entries for zeroed out instances of deleted sensitive objects.

16 Claims, 3 Drawing Sheets

(56) References Cited

U.S. PATENT DOCUMENTS

| | | | |
|---|---|---|---|
| 8,745,011 B2* | 6/2014 | Kishi | G06F 11/106 |
| | | | 707/692 |
| 9,405,764 B1 | 8/2016 | Wallace et al. | |
| 9,430,153 B2* | 8/2016 | Heller, Jr. | G06F 3/0673 |
| 9,646,067 B2* | 5/2017 | Abercrombie | G06F 16/27 |
| 10,649,682 B1* | 5/2020 | Chinthekindi | G06F 3/0608 |
| 2007/0180540 A1* | 8/2007 | Little | G06F 12/0261 |
| | | | 726/34 |
| 2011/0153689 A1 | 6/2011 | Hall et al. | |
| 2012/0066193 A1* | 3/2012 | King | G06F 12/0269 |
| | | | 707/704 |
| 2012/0167043 A1* | 6/2012 | Chapman | G06F 11/3644 |
| | | | 717/116 |
| 2012/0278564 A1* | 11/2012 | Goss | G06F 12/00 |
| | | | 711/155 |
| 2013/0124785 A1* | 5/2013 | Xiong | G06F 21/6245 |
| | | | 711/103 |
| 2015/0324130 A1* | 11/2015 | Lin | G06F 3/061 |
| | | | 711/112 |
| 2016/0203076 A1* | 7/2016 | Little | H04L 63/061 |
| | | | 713/189 |
| 2020/0097400 A1* | 3/2020 | Lee | G06F 12/0253 |

OTHER PUBLICATIONS

Hallenberg, Niels, Martin Elsman, and Mads Tofte. "Combining region inference and garbage collection." Proceedings of the ACM SIGPLAN 2002 Conference on Programming language design and implementation. 2002. (Year: 2002).*

Authors: Manoj Debnath, Advanced Concepts of Java Garbage Collection, Source: developer.com, Jun. 20, 2016, Retrieved from Internet: URL: http://www.developer.com/java/data/advanced-concepts-of-java-garbage-collection.html, 5 pages.

Authors: Microsoft team, Fundamentals of Garbage Collection, Source: Microsoft MSDN, copyright 2017, Retrieved from Internet: URL: https://msdn.microsoft.com/en-us/library/ee787088(v=vs.110).aspx, 7 pages.

Authors: Oracle team, Managing Memory and Garbage Collection, Source : Sun Java System Application Server 9.1 Performance Tuning Guide, ORACLE copyright 2010, Retrieved from Internet: URL: https://docs.oracle.com/cd/E19159-01/819-3681/6n5srthqf/index.html, 4 pages.

Danes, Mike; Protecting sensitive data in managed memory (pin, GC); https://social.msdn.microsoft.com/Forums/en-US/4abfb3ec-0b3e-49c9-a59f-2c848d5c259c/protecting-sensitive-data-in-managed-memory-pin-gc?; retrieved from the Internet Jun. 4, 2018; 5 pages.

* cited by examiner

OPERATING SYSTEM GARBAGE-COLLECTION WITH INTEGRATED CLEARING OF SENSITIVE DATA

BACKGROUND

The present invention relates in general to computerized operating systems and in particular to "garbage collection" and security components of an operating system. Operating systems provide memory-management, user-interface, storage-management, and security functions for computerized devices like personal computers, mobile devices, "smart" appliances and vehicles, and consumer electronics products. Security functions include facilities for securely storing sensitive data items, such as personally-identifying information (PII), passwords, credit-card numbers, and user-activity logs.

Operating systems, certain computer applications, and other computing environments also provide "garbage collection" features that delete unneeded, waste-spacing files like core dumps, deleted files preserved in a Recycle Bin or Trash folder, cache files, temporary files that had been created by applications or by the operating system, broken links or shortcuts, and other types of data items that are no longer useful.

Garbage collection may be performed by the operating system itself, by a system utility under control of the operating system, or by a software application that performs garbage collection on data items that the application itself creates or maintains. A garbage-collection operation may be launched automatically when a certain condition occurs or in accordance with a preset schedule, or when requested by a user, by a storage-maintenance utility, or by another application.

Files deleted during a garbage-collection operation may contain unprotected copies of sensitive data items. This can occur, for example, when an application crash produces a disk-resident crash dump or a memory-resident core dump that contains unencrypted passwords, email messages, or encryption keys, when the contents of an operating-system cache includes a user's account information or most-recently-used list, or when a Recycle Bin folder stores back-up copies of previously deleted sensitive data.

SUMMARY

An embodiment of the present invention is a computerized operating system of a computer system that performs a method for garbage collection with integrated clearing of sensitive data by directing a garbage-collection component of the operating system to initiate a garbage-collection (GC) operation, where the garbage-collection component includes:

a set of data structures that each identify that a corresponding stored instance of a data object contains sensitive data, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data.

Another embodiment of the present invention is a method for garbage collection with integrated clearing of sensitive data. A computerized operating system directs a garbage-collection component of the operating system to initiate a garbage-collection (GC) operation, where the garbage-collection component includes:

a set of data structures that each identify that a corresponding stored instance of a data object contains sensitive data, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data.

Yet another embodiment of the present invention is a computer program product including a computer-readable storage medium storing computer-readable program code that is compatible with a computer system that includes a processor, a memory coupled to the processor, and a computer-readable hardware storage device coupled to the processor. The stored program code is configured to be run by the processor via the memory to perform a method for garbage collection with integrated clearing of sensitive data.

An operating system of the computer directs a garbage-collection component of the operating system to initiate a garbage-collection (GC) operation, where the garbage-collection component includes:

a set of data structures that each identify that a corresponding stored instance of a data object contains sensitive data, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data.

DETAILED DESCRIPTION

Embodiments and examples described in this document may refer to implementing the present invention as an improvement to known operating systems. This should not be construed as limiting embodiments of the present invention to computer operating systems. Methods, systems, data structures, and inventive concepts analogous to those described in this document may also be implemented as improvements to any other software environment or system that i) comprises, controls, maintains, or has access to sensitive data; and ii) incorporates, provides, or requires garbage-collection services. When this document refers to the present invention as an improvement to, and a component of, an operating system, it is to be understood that such a reference also comprises implementations that improve, and are components of, these other software environments or systems.

Modern computer operating systems, as well as certain software applications, offer sophisticated security features for protecting sensitive data like user-account settings, personally identifying information (PII), encryption keys, and authentication criteria like passwords. These features do not, however, protect sensitive data that has been copied to an unsecured location, such as when a crash dump contains viewable, unencrypted passwords used by a crashed application; when deleting a sensitive file from a secured folder merely moves the file to an unsecured Recycle Bin or Trash folder; or when an operating system's temporary cache contains trace logs that reveal confidential user activities.

Other operating-system utilities create similar problems, such as a disk-compaction or data-compression utility that copies its output to a new location without zeroing out data stored at the original storage location of its input data items. Again, known operating-systems do not provide users, application developers, or administrators an option of sanitizing unsecured copies and relocated data items, resulting in the potential for even greater exposure.

Worse, garbage-collection components of operating-systems and applications typically create copies of collected "garbage" data items during the course of a garbage-collection procedure. Known garbage-collection facilities do not address this problem because existing operating systems do not promptly "sanitize" (zero out) previous storage locations from which a garbage collector copies sensitive data items. This results in the risk that a hostile party could harvest residual "orphan" copies of sensitive data items inadvertently left on disk or in memory.

When these problems are system-wide (or application-wide) issues, a solution consisting of a single program does not have the scope, access, or flexibility to resolve the resulting security problems. The present invention thus addresses these problems by adding new features to the operating system itself or, in the case of garbage collection performed by an application or computing environment, by adding new features to the application or environment. The improved garbage-collection functionality comprised by this invention provides an improvement to the operation of computerized operating systems or applications that makes those systems and applications more secure and better able to protect sensitive data from being inadvertently exposed by software failures and insecure data-manipulation and storage-management utilities.

Embodiments of the present invention improve existing computer operating systems by marking certain data objects as "sensitive" in a manner that is detectable by the operating system. The GC uses these identifications to ensure that, when the GC copies the sensitive object to a new location or detects an additional instance of the sensitive object within a collected object, the GC will direct the operating system to sanitize, zero out, or clear unsecured storage locations of the sensitive object.

In some embodiments, a sensitive object may comprise an array or other data structure of component objects, and in yet other embodiments, this mechanism may designate an entire class or other category of objects as being "sensitive."

This mechanism may be implemented on an object-by-object basis that allows the GC to manage each object independently. For example, the operating system's intrinsic messaging system or an application's calls through an Application Program Interface (API) may be used to request that a sensitive object be marked as such, or to notify the operating system's garbage-collection module (GC) that a secured "sensitive" object has been created.

For example, one embodiment might comprise adding to an operating system, or to a garbage-collection component of the operating system:

a set of API calls that each allocate storage for one type of sensitive object and that mark the created objects in a way that allows the operating system to identify the object as being sensitive;

a set of API calls that mark or otherwise identify an existing data object as a sensitive object; and a set of API calls that are used by a garbage-collector module to sanitize or zero out some or all instances of a sensitive object.

Other embodiments may use communications methods other than an API framework to communicate with the GC. For example, an embodiment implemented on a hosted cloud platform could make system calls to the cloud's cloud-management stack, or an embodiment implemented within a software application could send notifications to the application's internal garbage-collection function by means of the application's proprietary transaction-processing function.

Yet other embodiments may comprise a novel data structure that stores a list of sensitive data objects and associates each object of that list with a primary-storage or secondary-storage location at which an instance of that data object is stored. Such a data structure could also include tree structures or directed graphs that, like a root set, track software entities that call or are called by each sensitive object. These data structures could be created or maintained by the operating system or by the garbage-collection module itself by any means known in the art, such as by API calls, other types of system calls, transaction-request messages, or directives submitted through a user interface. The data structures may be created or maintained by the operating system's file-management components, by an application, by a system utility, by a user or administrator, or by any other entity responsible for security, file-maintenance, garbage-collection, or other appropriate system function.

In other embodiments, a data object may be marked as containing sensitive data by embedding certain information into the object's header or other identifier, or into the object itself. For example, an operating system could set a Sensitivity bit in the header of a file if that file is deemed to contain sensitive data, could add a 1-bit Sensitivity flag to character array that contains an alphanumeric password; or could add a numeric suffix to a string that stores a credit-card number. This setting may be performed when the sensitive object is created or at any subsequent stage in the object's life, such as when the object is first deemed to contain sensitive data. Some embodiments may also allow the garbage collector, or other operating system component to later set or reset a Sensitivity marking or identifier as the Sensitivity status of a data object changes over time.

In all cases, before a GC component performs a garbage-collection operation upon a data item, the garbage collector would first determine that the data item is sensitive, using any of the above mechanisms or other methods or data structures capable of marking a data item as being sensitive. As described in the FIGURES, the garbage collector would then incorporate into its garbage-collection procedure extra sanitizing steps for each data item identified as being sensitive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
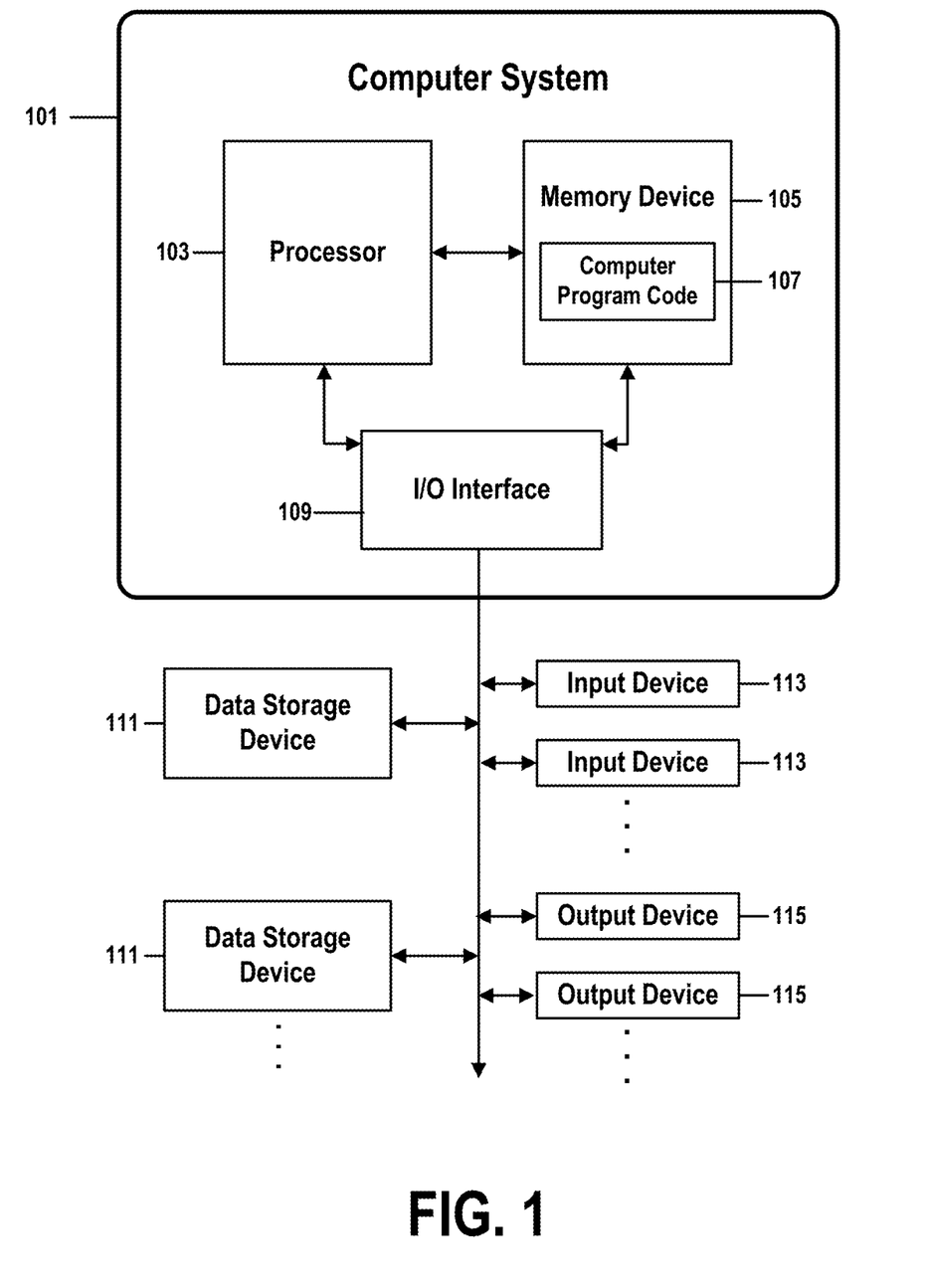
FIG. 1 shows the structure of a computer system and computer program code that may be used to implement a method for operating system garbage-collection with automatic clearing of sensitive data in accordance with embodiments of the present invention.

FIG. 1 shows a structure of a computer system and computer program code that may be used to implement a method for operating system garbage-collection with automatic clearing of sensitive data in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for operating system garbage-collection with automatic clearing of sensitive data in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for operating system garbage-collection with automatic clearing of sensitive data.

Any of the components of the present invention could be created, integrated, hosted, maintained, deployed, managed, serviced, supported, etc. by a service provider who offers to facilitate a method for operating system garbage-collection with automatic clearing of sensitive data. Thus the present invention discloses a process for deploying or integrating computing infrastructure, comprising integrating computer-readable code into the computer system 101, wherein the code in combination with the computer system 101 is capable of performing a method for operating system garbage-collection with automatic clearing of sensitive data.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for operating system garbage-collection with automatic clearing of sensitive data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for operating system garbage-collection with automatic clearing of sensitive data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
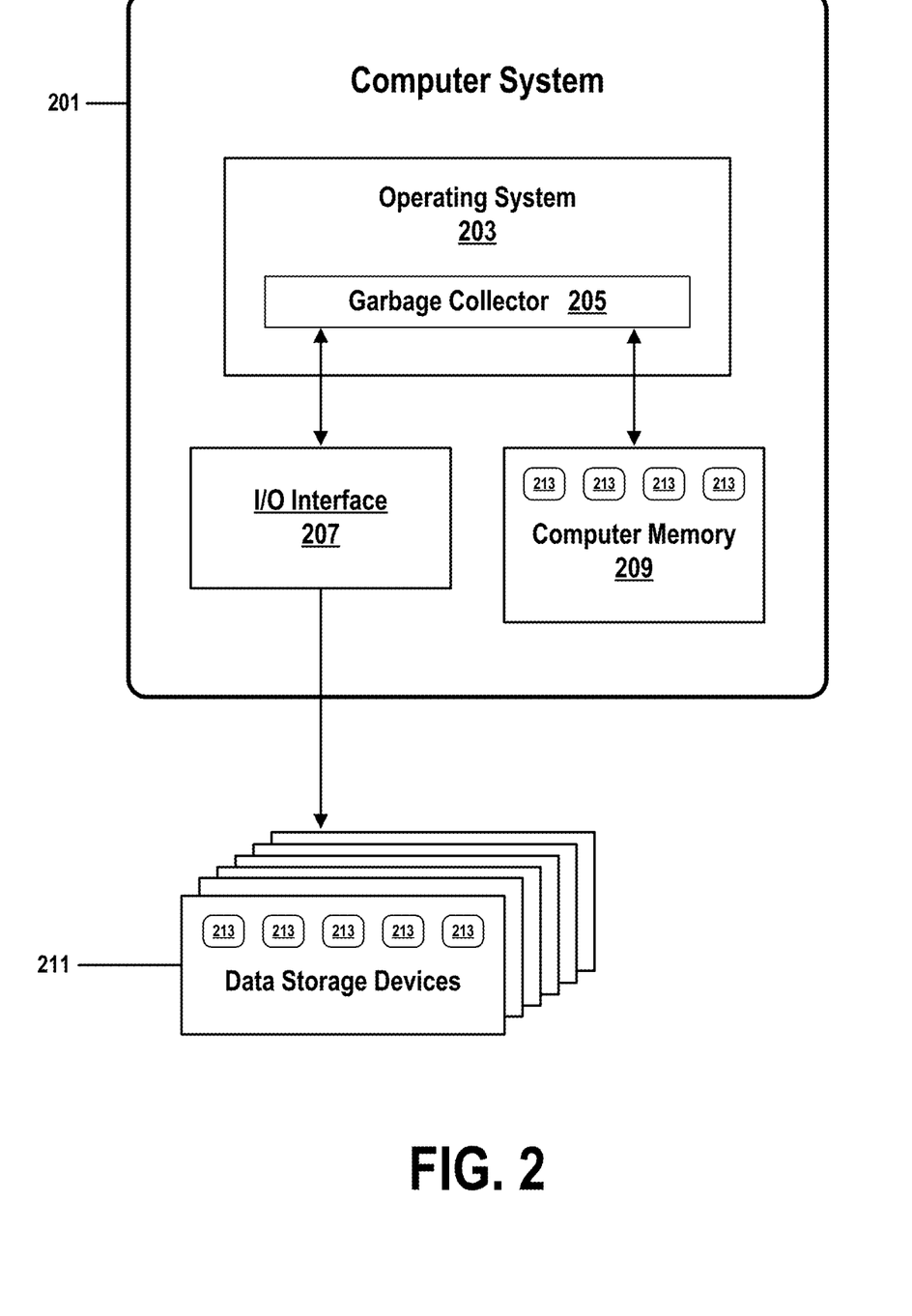
FIG. 2 shows an architecture of a garbage-collection function of a computer operating system.

FIG. 2 shows an architecture of a garbage-collection function 205 of a computer operating system 203. FIG. 2 shows elements identified by reference numbers 201-213.

Item 201 is a computerized device, such as a personal computer, mobile device, or smart appliance. Computer system 201 is managed by an operating system 203 that comprises a garbage-collection component or function 205.

As explained above, garbage collector 205 performs a variety of operations related to gathering and removing unwanted data items 213. These data items 213 may include copies of deleted files that had been backed up in a Recycle Bin or Undo area, temporary files or data structures used by applications or by an operating-system function, expired cookies, cached files that are no longer needed, crash dumps that are automatically created when an application or system unexpectedly terminate, broken segments or disk sectors of a corrupted file, "dead" data objects that are not in use by any application or service, and other data items that may be unnecessarily consuming space.

A garbage collector 205 may perform garbage-collection operations by removing such data items 213 from non-transitory data-storage devices and non-transitory media 211, through an I/O interface 207. These non-transitory storage devices and non-transitory media 211 may comprise any known, non-transitory secondary-storage or external-storage device or medium, such as a rotating magnetic disk drive, an optical disc, or a solid-state disk (SSD) storage device.

A garbage collector 205 may also perform operations that remove unwanted data items 213 from the computer system's 201 computer memory 209. This memory 209 may comprise any sort of memory technology known in the art, such as dynamic RAM or electrically erasable PROM. Unwanted data items 213 may have been stored in computer memory 209 for various reasons. For example: an application failure could automatically generate a memory-resident trace log or core dump; a communications program could store user-authentication criteria or passwords in memory 209 in order to improve performance; or a system utility could maintain a log file in memory 209 that is inadvertently left intact after the utility completes a particular activity. Even a garbage-collection utility may leave copies of sensitive data resident on sectors of a hard drive or at a location in computer memory when moving data objects during the course of a garbage-collection operation.

Figure 3A:
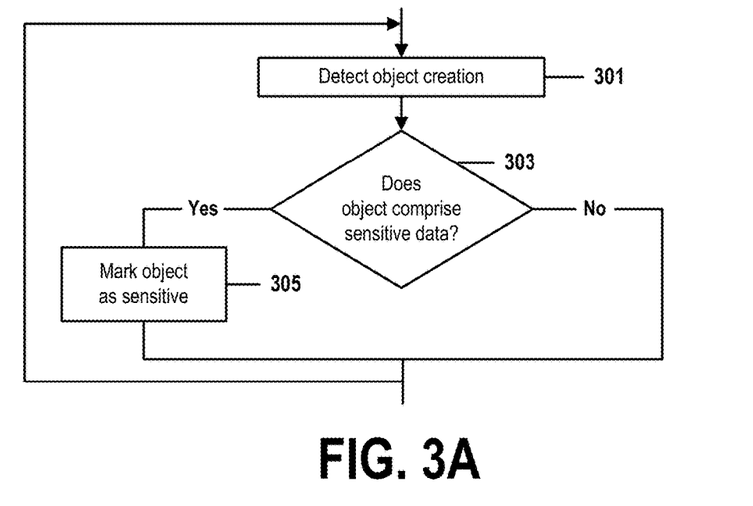
FIG. 3A is a flow chart that illustrates steps of a method for marking data objects as being sensitive, in accordance with embodiments of the present invention.

FIG. 3A is a flow chart that illustrates the steps of a method for marking data objects as being sensitive, in accordance with embodiments of the present invention. FIG. 3A contains steps 301-305 which may be performed by embodiments that incorporate the components of FIGS. 1-2.

In step 301, a computerized operating system, application, or other software system responsible for preserving the security of data created or maintained within a computing environment detects that a data object has been created. This object may comprise one or more non-transitory data elements, such as arrays, variables, files, databases, or any other data object that may be managed within the environment. The newly created object may in some cases be an additional instance of an existing object, where the new instance is stored at a different location than any other instances of the object.

In step 303, the system or application determines whether the newly created object contains sensitive data. This determination may be made by any means known in the art, such as by querying an application or utility that created the object, identifying the object's file type or classification, identifying a process, application, or runtime module that created the object, receiving notice from a user or application, or identifying a storage location in which the object is created or stored.

In step 305, if the system determines in step 303 that the object contains sensitive data, the system marks or otherwise identifies the data object as a sensitive object. As explained above, this identification may take any form and may be performed by any means known in the art.

For example, certain types of data items may be marked by setting an unused bit of the data item to a particular value. For example, the system could identify a stored file as being sensitive by setting a certain bit of the file's header to a value of 1; by creating an entry in the operating system's registry or in a cloud-management stack's catalog that identifies the object as being sensitive, by adding one or more identifying fields, records, or tables to a database; or by adding the object and its location to a list that may be referenced by the system's garbage-collection module.

In some embodiments, different types of objects may be marked or identified in different ways, as a function of each object's format, data type, data structure, creating entity, or other object-specific factors. Some embodiments may also augment the identification by further creating a list, tree, directed graph, or other list or hierarchical data structure that identifies a family of objects comprising the newly added data object. For example, if a system detects the creation of a data file, the system might create a directed data structure that comprises a path containing the data object, any children objects called by or created by the data object, and any parent objects that create, access, revise, or maintain the data object.

At the conclusion of the conditional procedure of steps 303-305, a new iteration of the iterative procedure of steps 301-305 begins. The system then continues to monitor the computing environment until the system detects the creation of another data object in step 301. This iterative procedure may continue indefinitely, or as long as the system continues operating.

Figure 3B:
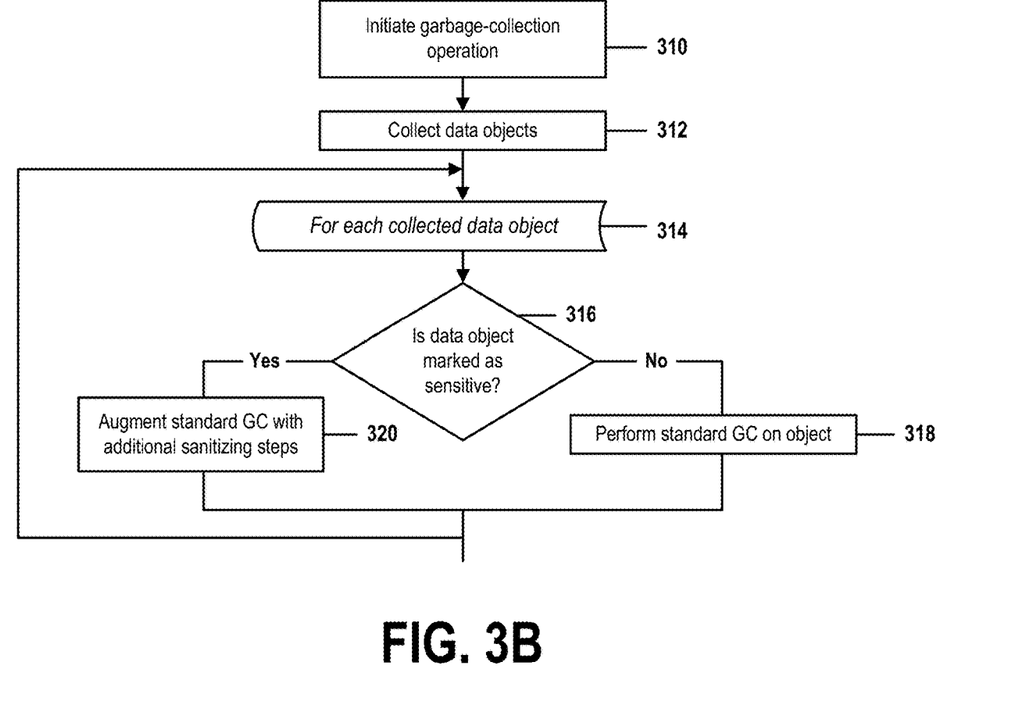
FIG. 3B is a flow chart that illustrates steps of a method for operating system garbage-collection with automatic clearing of sensitive data, in accordance with embodiments of the present invention.

FIG. 3B is a flow chart that illustrates the steps of a method for operating system garbage-collection with automatic clearing of sensitive data, in accordance with embodiments of the present invention. FIG. 3B contains steps 310-320 which may be performed by embodiments that incorporate the components of FIGS. 1-2.

In step 310, a garbage-collection component (GC) of the system or application initiates a garbage-collection operation. This initiation may be performed according to a preset schedule, in response to a request from an application, administrator, or end-user, in response to the detection of a certain condition (such as an age of a system-dump file), or by any other means known in the art.

In step 320, the GC collects data objects that have been identified as "garbage" objects by the system or application, or by the GC itself. This identification may be performed by any means known in the art. For example, a system may unconditionally identify as garbage any objects stored in an operating system cache or in a communications-module's I/O buffer; expired Web-site cookies, copies of deleted files stored in a Recycle Bin folder; crash-dump files and memory-resident core-dumps; bad disk sectors, volumes, or memory locations that have been partially reclaimed by a storage-repair utility; outdated configuration, installation, driver, and update files; unused log files; error reports; compressed file packages that have been uncompressed into original data; or broken desktop icons or hyperlinks.

Step 314 begins an iterative procedure of steps 314-320 that is performed once for each garbage data item identified in step 312.

In step 316, the GC module determines whether the garbage item being processed by the current iteration of steps 314-318 is a sensitive data object.

In step 318, the system, having determined in step 316 that the current object is not a sensitive object, performs a standard set of garbage-collection operations on the current object. Known operating systems may support different types of garbage collection operations, and the system in step 318 can perform any such known operations, as desired by an implementer.

For example, if the system determines in step 316 that the current garbage object is not sensitive, the system may copy the object to a temporary storage location on a solid-state disk drive or to a reserved area in memory. At the conclusion of the last iteration of the iterative procedure of step 318, the system would then permanently delete all such temporary copies and direct the operating system to delete references to all garbage objects collected in step 312.

It is important to note that standard garbage-collection practice may not delete the actual data stored at the original location of the garbage object. Deleting the original object merely alters a file directory or catalog entry for that entry to indicate that the object is no longer accessible through normal operating-system procedures. Similarly, moving the original object to a second location merely creates a new instance of the original object at the second location and alters a file directory or catalog entry to indicate that the object is no longer accessible through normal operating-system procedures at its original location. In either case, however, at least some of the actual data stored at that original location still remains on the storage medium, and that residual data may be accessed by forensic software or by other specialized tools.

In step 320, the system, having determined in step 316 that the current object is a sensitive object, augments the standard set of garbage-collection operations (such as those performed by step 318) performed on the current object with additional sensitive-object operations.

These sensitive-object operations may vary, depending on implementation details and on characteristics and content of the current object. In all cases, however, the augmented operations zero out or sanitize all locations at which an instance of the collected garbage object has resided. This sanitizing is performed to delete residual stored data that, despite the object's ostensible "deletion" by the operating system, physically remains at the previous location of the deleted object.

The augmented "sanitizing" operations, which are performed in step 320 only on objects identified in step 305 as being sensitive, are performed on the current data object before the garbage collector attempts to move or copy the object. These operations may comprise:

if the standard garbage-collection operation comprises moving or deleting the current object, the garbage collector zeroes out any residual data left at the object's original location after the move or deletion;

the garbage-collector may determine from a system operation, from a data-tracking file, from the garbage-collector's or operating system's "root set" file, from a tree or directed graph created in step 305, or from other sources, that the current object is "dead." That is, the system determines that no program or other software entity refers to the object or is referenced by the object. If this is the case, the system deletes every known instance of the object and zeroes out residual data stored at the locations of every deleted instance, if the current item is a memory-resident or disk-resident core dump file or other diagnostic file created in response to an unexpected interruption of a software application, the garbage collector may scan the file for embedded sensitive objects. This scanning may be performed by any means known in the art, such as by performing a pattern-matching search through the dump for each sensitive object enumerated in a list created in step 305. If a sensitive object is found in this manner, the garbage collector could zero out the instance of the object stored in the dump, or could create a new sensitive-item entry for this particular instance, to be processed by a future iteration of steps 310-320;

the system extends its sanitizing operations to the current object's entire family tree, performing similar operations on each parent and child object of the current object. These parent and child objects may be identified by the operating system, by a file-management system, or by an application within which the embodiment runs. If a directed graph or other data structure was created in step 305 to track the object's related objects, the system in this step would traverse the graph or data structure in one or more iterations of the steps 310-320 in order to sanitize every object in the branch. For example, if the current data object is a user's account name, the garbage collector in this step might traverse a graph of the object's family in order to identify sanitize instances of the object's child objects (such as the user's password, address, and credit-card number) and traverse the graph in the other direction to identify and sanitize the object's parent objects, such as a calling application that had originally stored the password;

once the GC has deleted all instances of the current sensitive object and sanitized the physical locations at which they had been stored, the garbage collector or operating system will delete entries for the current object from a sensitive-object list or other enumerating data structure created in step 305.

At the conclusion of the last iteration of the iterative procedure of steps 310-320, the improved garbage-collection method of FIG. 3A concludes.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A computerized operating system comprising a processor, a memory coupled to the processor, and a computer-readable hardware storage device coupled to the processor, the storage device containing program code configured to be run by the processor via the memory to implement a method for garbage collection with integrated clearing of sensitive data, the method comprising:

directing, by the processor, a garbage-collection component of the operating system to initiate a garbage-collection (GC) operation, where the garbage-collection component comprises:

a set of data structures that each identify that a corresponding stored instance of a data object contains sensitive data, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data, where the sanitizing a first location of a first unneeded instance comprises overwriting, by the processor, all data comprised by the first unneeded instance and stored at the first location, such that the overwritten data can no longer be accessed by the operating system, where a first data structure of the set of data structures comprises a first object identifier of a first instance of a first data object, where the first instance is accessible by the operating system, where the first data object contains sensitive data and a first storage identifier that identifies a location at which the first instance is stored, where the first data structure is a tree structure, where a first node of a first branch of the tree structure contains the first object identifier and the first storage identifier, where each descendant node of the first node contains object and storage identifiers of an instance of an object that is referenced by the first data object, where each ancestor node of the first node contains object and storage identifiers of an instance of an object that references the first data object, and where the sanitizing the first instance further comprises sanitizing, by the processor, all storage locations identified by any descendant node of the first node or by any ancestor node of the first node.

2. The system of claim 1, where the GC operation further comprises:

determining, by the processor, that the GC operation has moved a first unneeded object identified by the set of data structures as containing sensitive data, from an original location to a new location;

sanitizing, by the processor, the original location; and updating the set of data structures, by the processor, to change a storage identifier of the first unneeded object from the original location to the new location.

3. The system of claim 1, where the GC operation further comprises:

determining, by the processor, that the GC operation has deleted from a first location an unneeded instance identified by the set of data structures as containing sensitive data;

sanitizing, by the processor, the first location; and deleting from the set of data structures, by the processor, a data structure that associates the unneeded instance with the first location.

4. The system of claim 1, where the GC operation further comprises:

determining, by the processor, that a first unneeded object identified by the set of data structures is no longer referenced by any software entity managed by the operating system and no longer references any software entity managed by the operating system;

sanitizing, by the processor, all storage locations identified by the set of data structures as storing an instance of the first unneeded object; and deleting from the set of data structures, by the processor, all data structures that identify an instance of the first unneeded object.

5. The system of claim 1, where a first data structure of the set of data structures comprises:

a first sensitivity indicator embedded into metadata of a first instance of a first data object, where the first sensitivity indicator indicates to the operating system that the first instance contains sensitive data.

6. The system of claim 1, where the sanitizing a first location of a first unneeded instance comprises overwriting, by the processor, all data comprised by the first unneeded instance and stored at the first location, such that the overwritten data can no longer be accessed by the operating system.

7. The system of claim 1, where an instance of a data object is stored in the memory.

8. The system of claim 1, where an instance of a data object is stored on a non-transitory secondary storage device that is managed by the operating system.

9. The system of claim 1, where a data object is deemed to be sensitive if the data object comprises data that falls into any of a set of predefined categories deemed by the operating system to require heightened security measures.

10. A method for garbage collection with integrated clearing of sensitive data, the method comprising:

a computerized operating system directing a garbage-collection component of the operating system to initiate a garbage-collection (GC) operation, where the garbage-collection component comprises a set of data structures that each identify that a corresponding stored instance of a data object contains sensitive data, where a first data structure of the set of data structures comprises a first object identifier that identifies a first instance of a first data object that contains sensitive data, and a first storage identifier that identifies a location at which the first instance is stored, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data, where the sanitizing a first location of a first unneeded instance comprises overwriting, by the processor, all data comprised by the first unneeded instance and stored at the first location, such that the overwritten data can no longer be accessed by the operating system, where a first data structure of the set of data structures comprises a first object identifier of a first instance of a first data object, where the first instance is accessible by the operating system, where the first data object contains sensitive data and a first storage identifier that identifies a location at which the first instance is stored, where the first data structure is a tree structure, where a first node of a first branch of the tree structure contains the first object identifier and the first storage identifier, where each descendant node of the first node contains object and storage identifiers of an instance of an object that is referenced by the first data object, where each ancestor node of the first node contains object and storage identifiers of an instance of an object that references the first data object, and where the sanitizing the first instance further comprises sanitizing, by the processor, all storage locations identified by any descendant node of the first node or by any ancestor node of the first node.

11. The method of claim 10, where the GC operation further comprises:

the operating system determining that the GC operation has deleted from a first location an unneeded instance identified by the set of data structures as containing sensitive data;

the operating system sanitizing the first location; and the operating system deleting from the set of data structures a data structure that associates the unneeded instance with the first location.

12. The method of claim 10, where the GC operation further comprises:

the operating system determining that a first unneeded object identified by the set of data structures is no longer referenced by any software entity managed by the operating system and no longer references any software entity managed by the operating system;

the operating system sanitizing all storage locations identified by the set of data structures as storing an instance of the first unneeded object; and the operating system deleting from the set of data structures all data structures that identify an instance of the first unneeded object.

13. The method of claim 10, further comprising providing at least one support service for at least one of creating, integrating, hosting, maintaining, and deploying computer-readable program code, wherein the computer-readable program code in combination with the computerized operating system is configured to implement the directing the garbage-collection component to initiate the garbage-collection operation.

14. A computer program product, comprising a computer-readable hardware storage device having a computer-readable program code stored therein, the program code configured to be executed by a computer system comprising a processor, a memory coupled to the processor, and a computer-readable hardware storage device coupled to the processor, the storage device containing program code configured to be run by the processor via the memory to implement a method for garbage-collection with automatic clearing of sensitive data, the method comprising:

a computerized operating system directing a garbage-collection component of the operating system to initiate a garbage-collection (GC) operation, where the garbage-collection component comprises a set of data structures that each identify that a corresponding stored instance of a data object contains sensitive data, where a first data structure of the set of data structures comprises a first object identifier that identifies a first instance of a first data object that contains sensitive data, and a first storage identifier that identifies a location at which the first instance is stored, a sensitivity-monitoring module that automatically updates the set of data structures when the operating system determines that a data object accessible by the operating system has begun to store sensitive data, where the updating revises the set of data structures to identify that each instance of the accessible data object stores sensitive data, and a sensitivity-aware garbage-collector module that, during a GC operation:

removes, from locations on non-transitory storage devices managed by the operating system, unneeded instances of data objects, where an instance is deemed to be unneeded if the instance is in use by neither the operating system nor by any application managed by the operating system, and automatically sanitizes locations of any of the unneeded instances that are identified by the set of data structures as storing sensitive data, where the sanitizing a first location of a first unneeded instance comprises overwriting, by the processor, all data comprised by the first unneeded instance and stored at the first location, such that the overwritten data can no longer be accessed by the operating system, where a first data structure of the set of data structures comprises a first object identifier of a first instance of a first data object, where the first instance is accessible by the operating system, where the first data object contains sensitive data and a first storage identifier that identifies a location at which the first instance is stored, where the first data structure is a tree structure, where a first node of a first branch of the tree structure contains the first object identifier and the first storage identifier, where each descendant node of the first node contains object and storage identifiers of an instance of an object that is referenced by the first data object, where each ancestor node of the first node contains object and storage identifiers of an instance of an object that references the first data object, and where the sanitizing the first instance further comprises sanitizing, by the processor, all storage locations identified by any descendant node of the first node or by any ancestor node of the first node.

15. The computer program product of claim 14, where the GC operation further comprises:

determining, by the processor, that the GC operation has deleted from a first location an unneeded instance identified by the set of data structures as containing sensitive data;

sanitizing, by the processor, the first location; and deleting from the set of data structures, by the processor, a data structure that associates the unneeded instance with the first location.

16. The computer program product of claim 14, where the GC operation further comprises:

determining, by the processor, that a first unneeded object identified by the set of data structures is no longer referenced by any software entity managed by the operating system and no longer references any software entity managed by the operating system;

sanitizing, by the processor, all storage locations identified by the set of data structures as storing an instance of the first unneeded object; and deleting from the set of data structures, by the processor, all data structures that identify an instance of the first unneeded object.

* * * * *